United States Patent [19]

Mard

[11] Patent Number: 4,550,812
[45] Date of Patent: Nov. 5, 1985

[54] FIXED POSITION, FIXED FREQUENCY PENDULAR-TYPE VIBRATION ABSORBER WITH FREQUENCY LINEARIZATION

[75] Inventor: Kenneth C. Mard, Stratford, Conn.

[73] Assignee: United Technologies Corporation, Hartford, Conn.

[21] Appl. No.: 185,070

[22] Filed: Sep. 8, 1980

Related U.S. Application Data

[63] Continuation-in-part of Ser. No. 931,085, Aug. 4, 1978, abandoned.

[51] Int. Cl.$^4$ .............................................. F16F 7/10
[52] U.S. Cl. ............................. 188/379; 244/17.11; 244/17.27; 267/136; 416/145; 416/500
[58] Field of Search .............................. 188/380, 379; 244/17.11, 17.27; 416/145, 500; 267/136

[56] References Cited

U.S. PATENT DOCUMENTS

| | | | |
|---|---|---|---|
| 992,134 | 5/1911 | Kelly | 188/380 |
| 1,638,782 | 8/1927 | Paton | 188/380 |
| 1,874,039 | 8/1932 | Griswold | 188/378 X |
| 2,367,709 | 1/1945 | Duntov et al. | 188/380 |
| 2,586,043 | 2/1952 | Hodgson et al. | 188/380 |
| 2,908,491 | 10/1959 | Suozzo | 267/136 |
| 2,990,193 | 6/1961 | Heard | 188/380 |
| 3,005,520 | 10/1961 | Mard et al. | 188/380 |
| 3,314,503 | 4/1967 | Neubert | 188/379 |
| 3,419,238 | 12/1968 | Flory | 248/599 X |
| 3,445,080 | 5/1969 | Flannelly | 248/584 X |
| 3,497,164 | 2/1970 | Horak | 188/380 |
| 3,536,165 | 10/1970 | Desjardins | 188/380 |
| 3,548,972 | 12/1970 | Flannelly | 188/380 |
| 3,586,309 | 6/1971 | Freibauer | 267/136 |
| 3,836,098 | 9/1974 | Miyashita | 188/380 X |
| 3,845,827 | 11/1974 | Schulin | 188/1 B |
| 3,910,720 | 10/1975 | Vincent et al. | 416/145 |
| 3,932,060 | 1/1976 | Vincent et al. | 416/500 X |

FOREIGN PATENT DOCUMENTS

| | | | |
|---|---|---|---|
| 586422 | 3/1947 | United Kingdom | 416/145 |
| 1264637 | 2/1972 | United Kingdom | 416/145 |

*Primary Examiner*—George E. A. Halvosa
*Attorney, Agent, or Firm*—Vernon F. Hauschild

[57] ABSTRACT

A fixed frequency vibration absorber adapted to be fixedly mounted in a fixed vibration prone system. The vibration absorber is of the pendular-type with two dynamic masses suspended in pendular fashion from a base member, and with at least one coil spring acting upon the masses to establish and linearize the vibration absorber natural frequency.

8 Claims, 17 Drawing Figures

FIXED POSITION, FIXED FREQUENCY PENDULAR-TYPE VIBRATION ABSORBER WITH FREQUENCY LINEARIZATION

This is a continuation-in-part of application Ser. No. 931,085 filed Aug. 4, 1978 now abandoned.

CROSS REFERENCE TO RELATED APPLICATIONS

The subject matter disclosed herein is also disclosed and some of it is claimed in varying scope in applications filed on even date with parent application Ser. No. 931,085, namely applications entitled Fixed Position Variable Frequency Pendular-Type Vibration Absorber by Kenneth C. Mard and John Washburn U.S. patent application Ser. No. 931,084 filed Aug. 4, 1978, now abandoned, and which is now the subject matter of continuation-in-part U.S. patent application Ser. No. 201,864, filed Oct. 29, 1980, now U.S. Pat. No. 4,365,770, and Fixed Position Pendular-Type Vibration Absorber with Linearization at Fixed or Variable Frequencies by Paul Von Hardenberg, Kenneth C. Mard and Edward Lavoie U.S. patent application Ser. No. 931,083, filed Aug. 4, 1978, now U.S. Pat. No. 4,213,518.

TECHNICAL FIELD

This invention relates to vibration absorbers and more particularly to fixed vibration absorbers which utilize pendular construction and in which the natural frequency of the vibration absorber remains constant and thereby efficient throughout full pendular excursions of ±45° of the dynamic mass members by the linearizing effect of the spring loading the dynamic mass members.

BACKGROUND ART

In the fixed vibration absorber prior art the absorbers are basically fixed frequency absorbers which are capable of absorbing vibration over a relatively small range of frequency of the principal excitation source. Typical of these absorbers are the swastika-type absorber shown in U.S. Pat. No. 3,005,520 to Mard and the battery absorber presently used in helicopters, which is basically a spring mounted weight and generally of the type disclosed in a U.S. patent application Ser. No. 913,720 entitled Leaf Spring Tuned Vibration Absorber with Improved Weight Efficiency by John Marshall II and filed on June 7, 1978, now U.S. Pat. No. 4,230,291. These prior art absorbers are fixed frequency absorbers which are capable of absorbing vibrations over a relatively small range of rotor RPM. In addition, they are generally heavy, create substantial friction, and have bearings which are susceptible to wear.

Bifilar-type vibration absorbers have conventionally been used solely on rotating mechanisms, such as crankshafts of automobiles and aircraft engines and on helicopter rotors as shown in Paul and Mard U.S. Pat. No. 3,540,809. In these installations, the centrifugal force generated by rotation of the mechanism involved is necessary for the operation of the bifilar-type vibration absorber. In a fixed position vibration absorber of the type sought in this application, centrifugal force is not present. In this improved absorber, the force is generated by a spring connected within the absorber between the masses.

Another prior art absorber is shown in Desjardins et al U.S. Pat. No. 3,536,165 but it should be noted that this is not a bifilar vibration absorber, that it is a high friction and hence a high damping absorber and therefore a low amplification absorber so that it does not have the advantages of our bifilar vibration absorber.

DISCLOSURE OF INVENTION

A primary object of the present invention is to provide a vibration absorber of pendular construction and which operates at a fixed natural frequency throughout ±45° of absorber pendular motion.

In accordance with the present invention, the pendular vibration absorber frequency is established by a biasing spring force of selected spring rate acting by way of spring preload against the pendular suspended mass members to exert an internal force thereon. The spring rate of the spring is selected to compensate for spring rate reduction normally caused by pendular excursions of the mass member so that the spring rate and hence the internal force are substantially constant throughout pendular excursions of at least ±45°.

It is a further object of this invention to teach such a vibration absorber which is low in weight, small in envelope which utilizes the pendular principle to take advantage of low inherent damping, low friction, low maintenance, and high reliability characteristics, and which utilizes a spring of selected spring rate to compensate for the nonlinear pendulum effect of the bifilar at high amplitudes.

It is a further object of this invention to teach a vibration absorber which minimizes friction, and hence is a minimal damping absorber. This minimal friction and low damping characteristic of our absorber results in higher absorber amplification, that is a higher quotient of mass motion divided by aircraft motion, so that higher mass reaction loads can be realized to control fuselage vibrations. Thus, lower damping in this vibration absorber results in lower weight required to achieve the desired vibration suppression.

It is still a further object of this invention to provide an improved vibration absorber utilizing pendular, preferably bifilar or trifilar principles, to obtain their low inherent damping, light weight and small envelope advantages and to utilize a spring to compensate for the nonlinear pendulum effect when the damper is used at high angular amplitudes, which would otherwise change the frequency of the system to make the system ineffective. By utilizing the pendular principle and coil spring arrangement, the construction taught herein produces a vibration absorber having low inherent damping, thereby permitting the use of lower weight dynamic masses in the pendular absorber, thereby not only reducing the weight of the vibration absorber but also of the principle system, such as the helicopter.

It is an important teaching of our invention to utilize a compressed coil spring member acting on the two movable mass means in our pendular-type vibration absorber so that a particular selected compression in the spring height establishes the amount of preloading in the spring member and hence the tuning frequency of the absorber for a given rotor RPM, or other principal excitation source. The spring rate is selected to linearize the system so that the absorber natural frequency is substantially invariant. This invariant feature is important in maintaining high amplification and high dynamic mass motions in the vibration absorber so as to permit the reduction of absorber weight.

It is a further object of this invention to teach such a vibration absorber in which the spring members impose maximum internal loads on the mass members when the mass members are at their end travel, maximum angular positions in their arcuate, pendular excursions, since the mass members impose maximum compression force and displacement and hence loading of the spring members at these maximum angular positions to thereby effect linearization of the vibration absorber so that its natural frequency is nonvariant throughout its full range of pendular motion up to ±45°.

Other object and advantages of the present invention may be seen by referring to the following description and claims, read in conjunction with the accompanying drawings.

BEST MODE FOR CARRYING OUT THE INVENTION

The vibration absorber taught in this application will be described in the environment of a helicopter in which the vibration absorber is fixedly mounted in a helicopter fuselage to coact with the principal helicopter vibration excitation source, namely, the rotor or rotors, to reduce the vibration imparted to the fuselage thereby.

Figure 1:
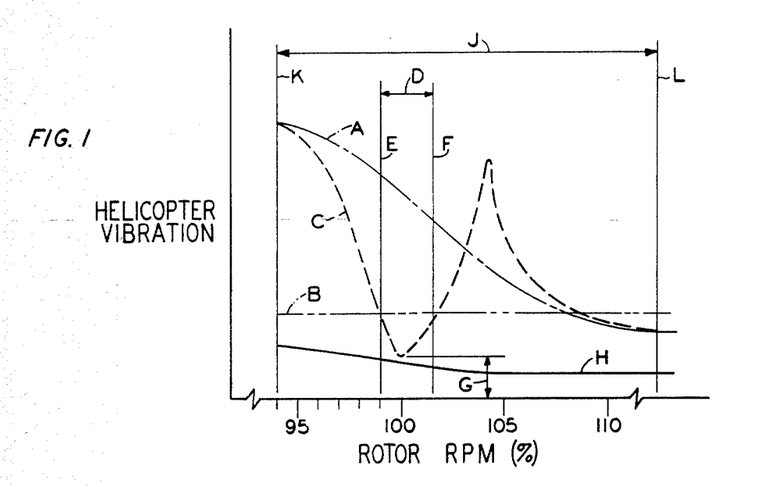
FIG. 1 is a graph showing helicopter fuselage vibration plotted against rotor RPM to show the operation of the prior art fixed vibration absorbers.

To appreciate the operation and advantages of this variable frequency vibration absorber, the short-comings of the fixed frequency, fixedly positioned prior art vibration absorbers will be discussed. Referring to FIG. 1 we see a graph A of helicopter fuselage vibrations plotted against helicopter rotor RPM. It is well known that the vibration generated by a rotor and the response of the helicopter structure thereto varies and is a function of rotor RPM, as shown typically by graph A. Line B indicates the vibration line below which acceptable fuselage vibration occurs. The prior art fixed frequency, fixed position vibration absorbers would operate generally along graph C, and it will be noted that such a vibration absorber is effective over range D between lines E and F. It will be noted that range D covers a small variation or span in rotor RPM over which the prior art vibration absorbers are effective. Range D is determined by the mass ratio of the absorber, that is the ratio of the weight of the absorber to the effective weight of the substructure in which the absorber is fixedly mounted, and in part by the inherent damping of the vibration absorber and the substructure. With the prior art absorbers, to obtain a relatively wide range D of absorbing, a very heavy vibration absorber would be required. Dimension G, the minimum achievable vibration level, would be determined by the amount of inherent damping in the absorber, and in part by the inherent substructure damping, and in part by the aforementioned mass ratio. If, theoretically, a vibration absorber could be utilized which has zero inherent damping, maximum vibration absorption would occur so as to achieve minimum fuselage vibration, i.e., dimension G would be reduced. Such a system cannot be realized in practice.

The objective of this vibration absorber is to be able to get maximum vibration absorption, indicated by any point along line H over a greater range J of rotor RPM, lines K and L representing minimum and maximum necessary operating or excitation RPMs of the helicopter or other principal substructure.

To understand the purpose and operation of this vibration absorber, it is first necessary to understand the difference between a vibration absorber and a vibration damper. A vibration damper serves to dissipate the energy of the vibrations imparted to the fuselage by the rotor. Vibration dampers can use friction principles or any type of energy damping principle. A vibration absorber, on the other hand, does not dissipate already established vibration energy but establishes a second vibratory mode in the system so as to coact with the principal system mode to produce a resultant mode which has minimum vibration. Stated another way, a vibration damper damps already created principal system vibrations, while a vibration absorber coacts with the system principal vibration excitation source to change its characteristics to a low vibration system.

Figure 2:
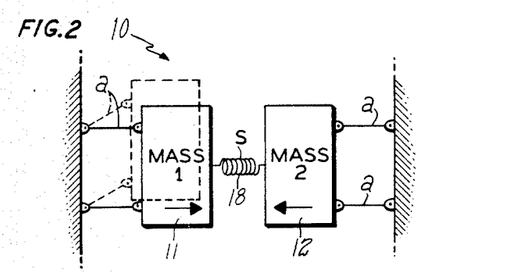
FIG. 2 is a schematic representation of one embodiment of my vibration absorber.
Figure 3:
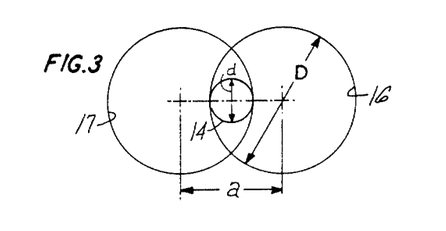
FIG. 3 is a schematic representation of a portion of the connection between the base and one of the mass members to produce the desired low friction, low inherent damping, pendular result.

A schematic representation of one form of this vibration absorber 10 is shown in FIG. 2. In FIG. 2 masses 11 and 12, of selected mass, are supported from base members by suspension arm members a, which can be considered to be pendulous members as illustrated by the phantom line motion for mass 11. In practice, pendular arm a is actually the pin and bushing connection shown representatively in FIG. 3 in which pin member 14 of diameter d is positioned in hole 16 of one of the mass members 11 or 12 and overlapping hole 17 in the base member so as to produce an equivalent pendulum motion of pendulum arm a, in which arm a equals the difference between hole diameter D and pin diameter d, i.e., $a = D - d$. Spring 18 is positioned between masses 11 and 12 and serves to draw them together and thereby preloads the selected masses so suspended to establish an internal force therein and thereby establish the natural frequency of masses 11 and 12, and therefore the natural frequency of absorber 10. The natural frequency of masses 11 and 12, and hence absorber 10, is determined by the preload of spring 18 and the mass of mass members 11 and 12, which are preferably of equal mass. Spring 18 performs another important function, in particular, it makes linear the nonlinear characteristics of the pendulum construction. To explain this linear/nonlinear concept, reference will be made to FIG. 2. It will be noted by viewing FIG. 2 that as arms a pivot to move mass 11 from its solid line to its phantom line position, the spring rate of the conventional bifilar system, considering only the preload from spring 18 and not the spring rate, is reduced and therefore the natural frequency of the bifilar system is reduced to thereby reduce its effectiveness. This reduction in natural frequency of the mass member with amplitude causes the system to be nonlinear, and limits its range of effectiveness. This nonlinear vibration characteristic of a pendular system occurs immediately upon any angular motion although a practical angle of excess would typically be 10°. We could prevent the system from swinging beyond 10° by increasing the length of the pendulum arms a but this would be undesirable because this would produce a heavier system requiring a larger space envelope.

With spring 18 present, however, as mass 11 swings from its solid line to its phantom line position, the changing force of spring 18 acting on mass 11 is increased, thereby tending to keep the system linear by keeping the equivalent absorber spring rate and natural frequency of the bifilar system shown in FIG. 2 at its original value. In this vibration absorber, we maintain the low weight and small space envelope advantage of a short pendulum arm a, yet produce a linear system by controlling the natural frequency of the vibration absorber by manipulation of the force generated by spring 18 and imparted to the masses 11 and 12.

Figure 4:
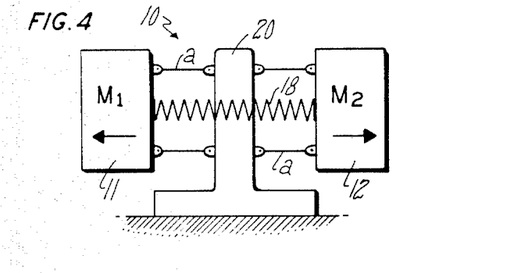
FIG. 4 is a schematic representation of the preferred embodiment of my vibration absorber.

The preferred embodiment of vibration absorber 10 is shown schematically in FIG. 4 in which masses 11 and 12, of selected mass, are supported from central base member or ground 20 by pendular-type connections represented by arms a and have internal force applied thereto to establish system natural frequency by spring 18, of selected preload and spring rate, which serves to force masses 11 and 12 to separate. Spring 18 further causes masses 11 and 12 to move in coincident, allochiral pendular motion as described further in connection with FIG. 16.

Figure 5:
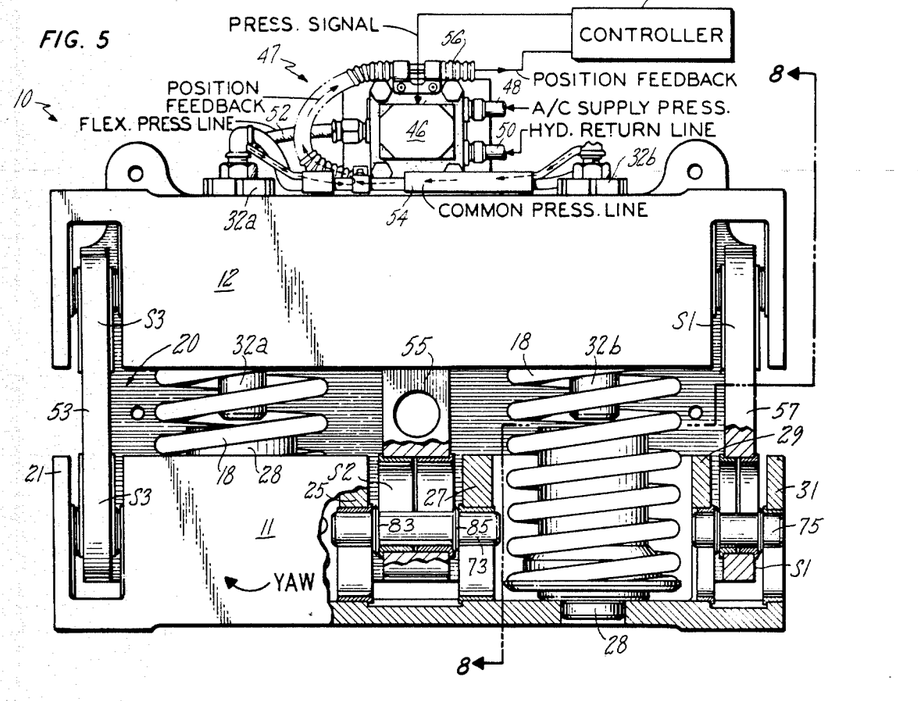
FIG. 5 is a top view, partially broken away and with control mechanism illustrated as attached thereto, of the preferred embodiment of the vibration absorber shown in FIG. 4.
Figure 6:
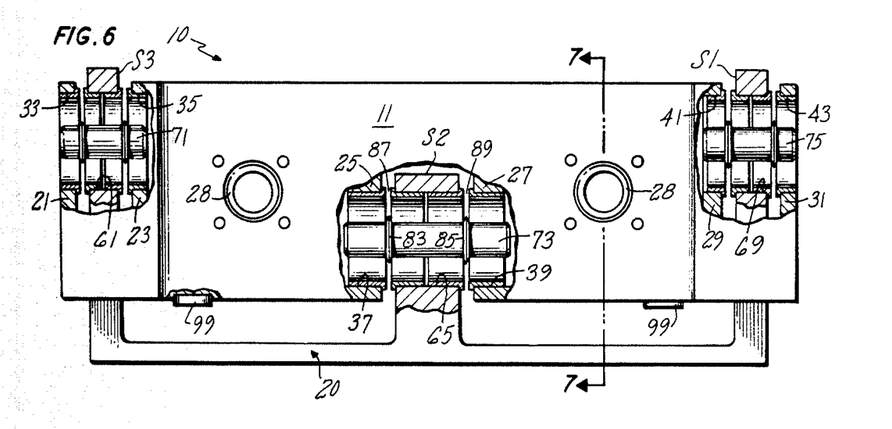
FIG. 6 is a side view, partially broken away, of the vibration absorber of FIG. 4.
Figure 7:
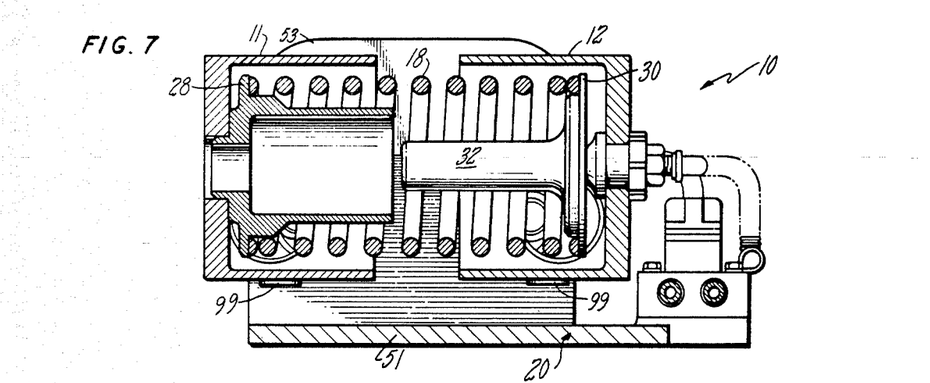
FIG. 7 is a view, partially broken away, taken along line 7—7 of FIG. 6.
Figure 8:
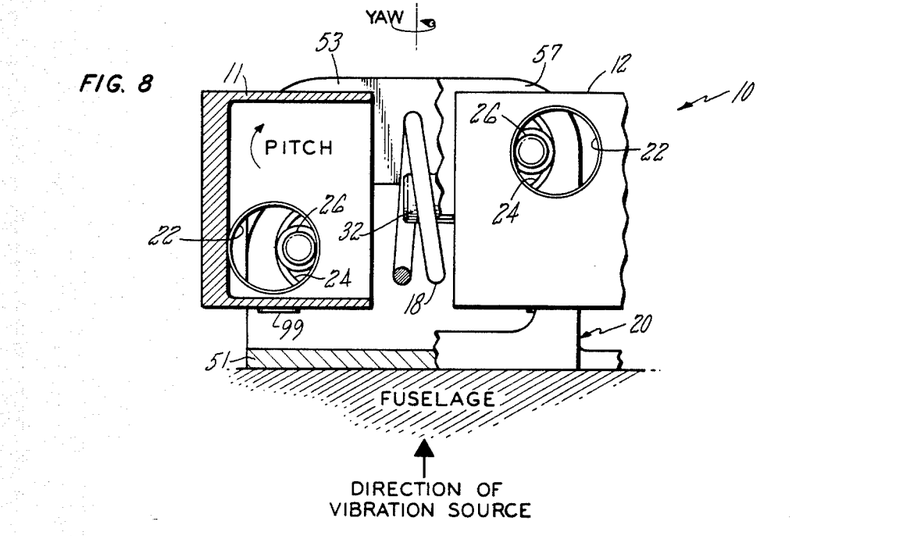
FIG. 8 is a view, partially broken away, taken along line 8—8 of FIG. 5.

For a more particular description of the preferred embodiment reference will now be made to FIGS. 5-8 in which base member 20, which is fixed to the fuselage as shown in FIG. 8, supports selected mass members 11 and 12 therefrom in pendular fashion. Each mass member 11 and 12 is supported from the base member 20 by three pendular connections similar to FIG. 3, thereby forming a trifilar connection, and each of the three connections including, as best shown in FIG. 8, an aperture 22 in masses 11 and 12 and an overlapping aperture 24 in base 20 and each having a pin member 26 extending therethrough. As best shown in FIG. 5, each mass means 11 and 12 is connected to base member 20 at three such pendular connecting stations along the mass length, which stations are designated as S1, S2 and S3. As best shown in FIG. 6, the pendular connection at station S2 is at the bottom of each mass while pendular connections S1 and S3 are at the top of each mass. In view of this three station connection, reminiscent of the three-legged stool, the mass is given geometric stability as supported from base 20 in both the yaw direction shown in FIGS. 5 and 8 and the pitch direction shown in FIG. 8. It will therefore be seen that to this point our vibration absorber includes two mass members 11 and 12 oppositely supported in selectively spaced connecting stations from base member 20. The connections may be of the type more fully disclosed in U.S. Pat. No. 3,540,809 to W. F. Paul et al. In FIG. 7, one of two spring members 18 is shown extending between masses 11 and 12, utilizing spring retainers 28 and 30. Springs 18 are of selected spring rate so that when installed and preloaded, the springs provide the necessary internal force to mass members 11 and 12 to establish a selected natural frequency of masses 11 and 12 and therefore of vibration absorber 10. With spring 18 assembled as shown in FIG. 7 and preloaded, it will be observed that the spring serves to impart a separating force to mass means 11 and 12.

Figure 17:
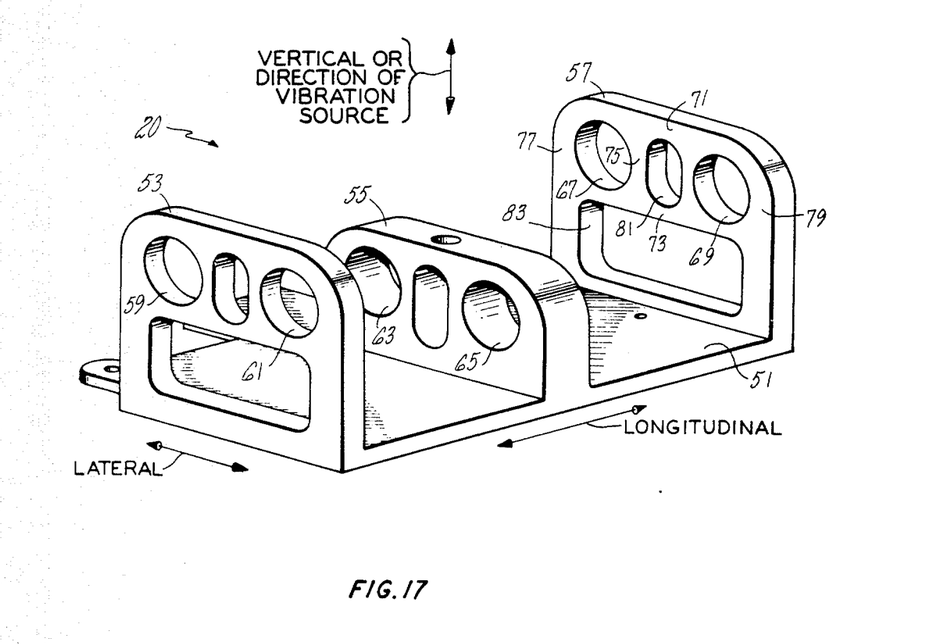
FIG. 17 is a perspective showing of the base member of the vibration damper with the other parts of the vibration absorber removed therefrom.

The construction of base member 20, which is preferably of a one-piece construction, is very important to this invention. As best shown in FIG. 17, base member 20 comprises flat platform 51 extending longitudinally of the base member as shown in FIG. 17 and constituting a solid base for the base member 20 so that platform 51 may be attached in any conventional fashion, such as by nuts and bolts, to the fixed vibration prone system which our vibration absorber is intended to operate in. Three parallel, laterally extending plate members 53, 55 and 57 extend perpendicularly from platform 51 and extend in the lateral direction, which is the direction or plane of desired mass member motion. End plate members 53 and 57 are identical in shape and project a substantially greater height out of platform 51 than does central plate member 55. Plate members 53, 55 and 57 each have equally laterally spaced apertures 59 and 61, 63 and 65, 67 and 69 therein, respectively. Apertures 59-69 are of equal diameter and their axes extend perpendicular to plate members 53, 55 and 57, and therefore perpendicular to the direction of desired dynamic mass motion for the vibration absorber. Apertures 59 and 61, and 67 and 69 are the same height above platform 51, while apertures 63 and 65 are substantially closer thereto. By viewing FIG. 17 it will be observed that apertures 59-69 form two sets of three equal diameter apertures having parallel axes and with each aperture positioned at the corner of a triangle. The first three aperture set consists of apertures 61, 65 and 69, while the second aperture set consists of apertures 59, 63 and 67. These two aperture sets are parallel to one another and, in view of the fact that the apertures in each set are positioned at the corner of a triangle, they form the basis, when joined to mass members 11 and 12 as more fully disclosed in FIGS. 5 and 6, for three point pendular of bifilar-type connection between the mass members and the base member, which three points of pendular connection are offset in two perpendicular directions, which are coplanar. To be more specific, for example, aperture set 59, 63 and 67 includes three longitudinally offset apertures 59, 63 and 67, and also includes aperture 63 which is vertically offset from equal height apertures 59 and 67. This three point triangular-type connection between the mass members and the base member provide geometric stability so as to prevent both roll and yaw tumbling of the mass members with respect to the base member.

With respect to the construction of plate members 53, 55 and 57 and in particular their construction in the areas where the apertures pass therethrough, it is important to note that these plate members provide substantial structural support to the mass members which will be supported therefrom in that, as best shown in FIG. 17 and illustrated with respect to plate member 57, apertures 67 and 69 have two parallel beam portions 71 and 73 extending laterally across the plate member above and below the apertures and structural web section 75 extending between beam members 71 and 73 at a station between apertures 67 and 69 so as to form an I-shaped structure, formed by beam members 71 and 73 and support web 75, at the load carrying station of plate member 57 in which dynamic mass member supporting apertures 67 and 69 are located. In fact, this I-shaped structure is strengthened by the fact that its ends are closed at portions 77 and 79 to form a closed box construction consisting of sections 71, 77, 73 and 79, with structural web section 75 extending through the center thereof. Mass member loads reacted by plate member 57 at apertures 67 and 69 are imparted to plate member 57 at this high strength structural section and therefrom into platform member 51 for transmittal to the fixed vibration prone system, such as the fuselage of the helicopter. The load carrying demands on plate member 57 might be such that the plate may include lightening and maintenance access holes 81 and 83. It will be noted that while plate member 57 has been used to describe the structure of the plate members in the vicinity of the apertures, plate members 53 and 55 are similarly constructed.

As best shown in FIGS. 5 and 6, the dynamic mass members 11 and 12 extend longitudinally along opposite lateral sides of base member 20 and each is preferably of one-piece construction and fabricated to include plate members 21, 23, 25, 27, 29 and 31 which extend parallel to plate members 53, 55 and 57 of base member 20 and extend in the direction of mass member motion or in the plane of mass member motion. The mass member plate members constitute three sets, with the first set 21 and 23 being positioned on opposite sides of and selectively spaced longitudinally with respect to base member plate member 53, the second set 25 and 27 being positioned on opposite sides of base plate member 55 and selectively spaced longitudinally with respect thereto, and third set 29 and 31 positioned on opposites of base plate member 57 with selected longitudinal spacing therebetween.

As best shown in FIGS. 5 and 7, each parallel compression coil spring 18 is received at its opposite ends in spring end retainers 28 and 30, which retainers are supported in mass members 11 and 12 as shown. In addition, the opposite ends of coil spring 18 are ground to properly fit into retainers 28 and 30 and thereby aid the spring static stability so that it needs no support between its ends.

Each mass member plate member has an aperture therein of equal diameter with the apertures in all other mass member plate members and of equal diameter with the apertures in the plate members of the base member 20. Each plate member aperture is concentric about axes which are not shown but which are perpendicular to the plate member and parallel to each other. As best shown in FIGS. 5 and 6, these mass members apertures include apertures 33, 35, 37, 39, 41 and 43 in plate members 21-31, respectively. As will be seen in FIGS. 5 and 6, the apertures in the plate members of the base member overlap with the apertures in the plate members of the mass members and each has a cylindrical, flanged bushing inserted therein as shown, which bushing is fabricated of an anti-friction material, such as hardened stainless steel.

A solid, substantially cylindrical pin extends through each set of aligned apertures as shown in FIGS. 5 and 6. These pin members which are visible are designated as 71, 73 and 75 but it should be noted that each mass member 11 and 12 is connected to and supported from base member 20 at three pendular or trifilar-type connecting stations S1, S2 and S3, which stations are defined by the overlapping apertures of the base member and the mass members and the pin members. The pin members 71-75 are fabricated of an anti-friction material such as a carbonized steel. As can be best seen in FIG. 6, these pendular connecting stations S1, S2 and S3 are longitudinally offset from each other to provide geometric stability between the mass members and the base members to prevent roll moments therebetween, and are also vertically offset to provide the necessary geometric stability to prevent yaw moments between the mass members and the base member. Due to this three position pendular, trifilar-type connection between each mass member 11 and 12 and the base member 20, each mass member moves in pendular, arcuate translational motion with respect to the base member so as to be parallel thereto at all times. To minimize friction and hence damping of the system, each pin member includes a tapered circumferential flange illustrated in FIGS. 5 and 6 in connection with pin 73 only and indicated at 83 and 85, however all pin members have such tapered flanges. Flanges 83 and 85 are positioned in the longitudinal spacing 87 and 89 between the bushing apertures through which pin member 73 extends and are tapered in a radially outward direction so as to be of minimal thickness at their outer periphery and hence serve to produce minimum friction contact between the relatively movable mass members and base member during the full mode of pendular operation therebetween.

It will therefore be seen that this vibration absorber produces minimal friction, solely the minimal flexing friction of the coil spring members 18 and the rolling friction of roller members 71-75. This vibration absorber is therefore low in damping, high in amplification, with lower weight supported masses 11 and 12, thereby reducing the weight of the absorber and the overall aircraft.

With respect to spring members 18, it is important that the spring deflection, free length and mean diameter be selected so that the coil spring is statically stable when its ground ends are positioned between spring retainers 28 and 30. The importance of this spring static stability is that it does not require additional spring support mechanisms, such as a center spring guide, since such would add weight, friction and damping to the system to thereby reduce the effectiveness of the vibration absorber. It should be noted that maximum spring deflection is achieved when first, the absorber is tuned to its highest operating frequency and second, the absorber is operating at its maximum pendular amplitude so as to avoid excessive transverse spring deflections, since any touching of parts could cause fretting or friction, both of which are detrimental to absorber life or performance. In addition, both the transverse and axial natural frequencies of the spring are selected to be detuned from the system excitation frequencies so as to avoid excessive spring motions, since any touching of parts caused thereby could produce fretting or friction, both of which are detrimental to absorber life or performance.

Actuator 32, shown in FIG. 7 is positioned in series with spring 18 between masses 11 and 12. Actuator 32 may be actuated initially to impose a force to selectively preload spring 18 and establish the initial natural frequency of vibration absorber 10. Spring 18 is so preloaded since it is grounded to base 20 through masses 11 and 12. Actuator 32 may thereafter be actuated to either increase or decrease the natural frequency of vibration absorber 10. When actuator 32 is controlled as a function of helicopter rotor RPM, the actuator is then varying the deflection of spring 18 to thereby vary the internal forces on mass means 11 and 12, and hence to vary the natural frequency of absorber 10 as a function of rotor RPM from its initial natural frequency caused by initial preloading or from its last actuator established natural frequency. In this fashion, the natural frequency of vibration absorber 10 is controlled as a function of rotor RPM to coact with vibration excitation forces imposed on the fuselage by the rotor to thereby reduce fuselage vibration.

Figure 9:
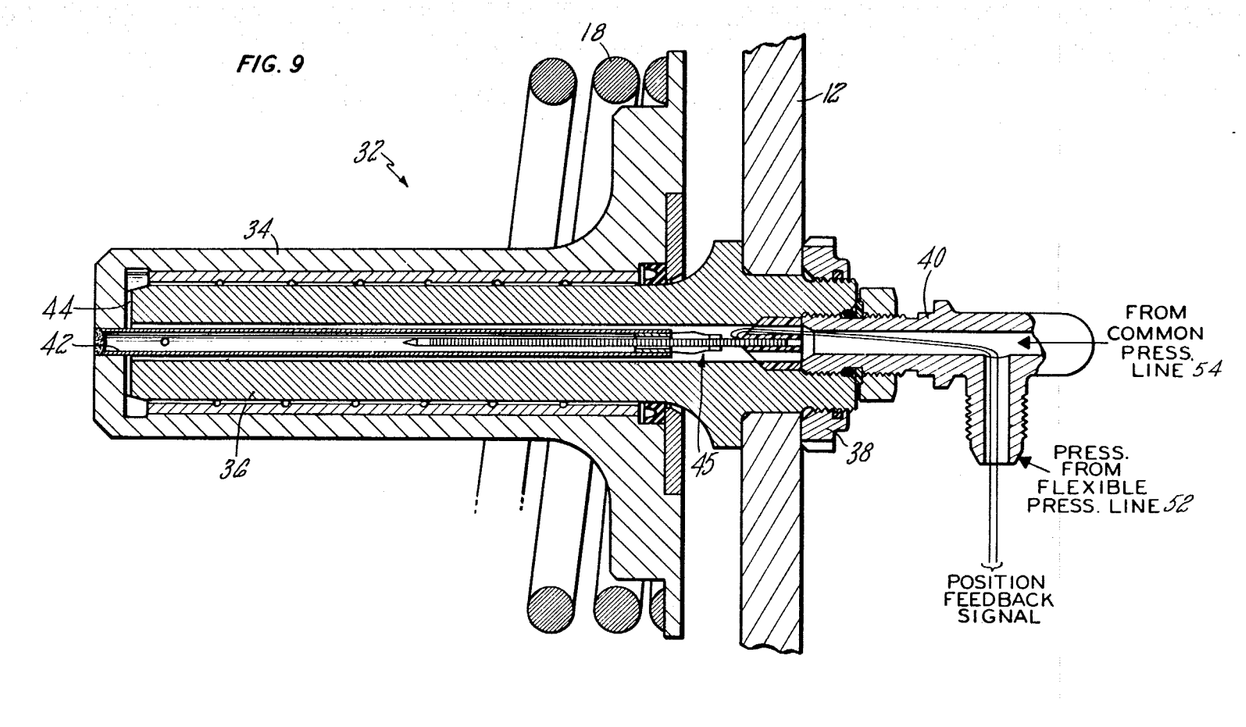
FIG. 9 is a cross-sectional showing of an actuator which could be used with my vibration absorber.

The construction of actuator 32 may best be understood by viewing FIG. 9. The actuator consists of telescoping sleeve members 34 and 36, the former being translatable with respect to the latter, and the latter being fixedly connected to the mass means 12 by conventional connecting means 38. Selectively pressurized fluid from a control system to be described hereinafter enters adapter 40 and flows therethrough and through passage 42 into hydraulic chamber 44 where it exerts a force causing sleeve member 34 to move leftwardly with respect to fixed member 36 to thereby compress spring 18 as it so moves. This compression of spring 18 adds to the internal force applied to mass means 11 against which it directly bears through retainer 28. Similarly, due to the fluid pressure so exerted on fixed sleeve 36, which is attached to mass means 12, actuator 32 similarly creates greater internal force in mass means 12. Actuator 32 also includes a position transducer 45 which is of conventional design and operates in typical rheostat fashion to send a position feedback signal, representative of the position of movable member 34 as determined by the pressure in chamber 44, to the actuator control system 47. There are other prior art actuators which could be used in this vibration absorber, for example, the positioning actuator sold under part number A-24553-2 by Moog, Inc., Aerospace Division of Proner Airport, East Aurora, New York 14052. Another prior art actuator is an electric screw-type actuator with feedback of the type manufactured by Motion Controls Division of Simmonds Precision, Cedar Knolls, New Jersey.

Figure 10:
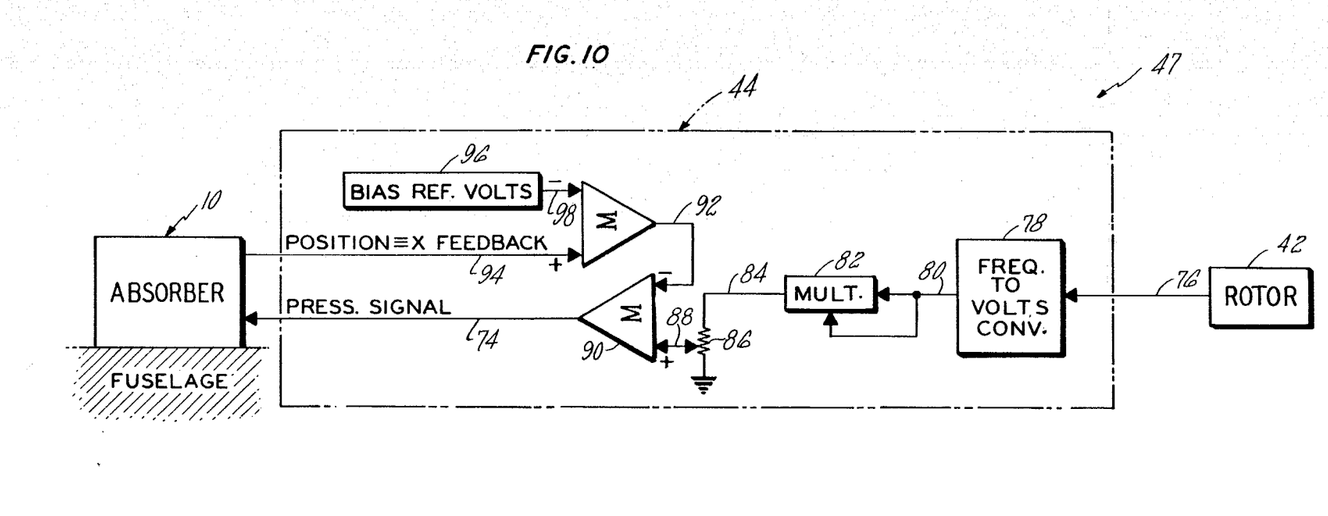
FIG. 10 is a showing of the natural frequency control mechanism utilized with my absorber in the helicopter environment.

Attention is now directed to FIG. 10 for an explanation of the control system 47 used to vary the natural frequency of absorber 10 as a function of rotor RPM. As shown in FIG. 10, helicopter rotor 42, possibly through a tachometer, imparts a rotor speed (RPM) signal to controller 44. The controller 44 operates to provide a signal on a line 74 to the absorber 10 that is proper to control the valves in the absorber 10 to provide displacement as the square of rotor speed within an operating range of rotor speeds as is described with respect to FIG. 11 hereinafter. Assuming the rotor 42 provides a tachometer signal on a line 76 which varies in frequency as a function of rotor speed, conversion to a DC voltage proportional to rotor speed may be made by any conventional frequency-to-voltage converter 78, which may, for instance, comprise a simple integrator, or a more complex converter employing a Teledyne Philbrick 4708 frequency-to-voltage conversion circuit, or the like. In any event, a DC signal on a line 80 as a function of rotary speed of the rotor 42 is provided to both inputs of an analog multiplier circuit 82, of any well known type, so as to provide a signal on a line 84 which is a function of the square of rotor speed. A potentiometer 86 is provided to allow a gain adjustment, whereby the overall effect of the control can be adjusted to suit each particular aircraft. This provides a suitable signal on a line 88, which is some constant times the square of rotor speed, to a summing amplifier 90, the other input of which is a feedback error signal on a line 92 which combines the actual position of the actuator 32 in response to the position sensing potentiometer 45 (FIG. 9), on a line 94, and a bias reference provided by a source 96 on a line 98. Thus the output of the summing amplifier 90 provides a signal on the line 74 to direct the actuator to a position determined as some constant times the square of rotor speed, which position is maintained in closed loop fashion by the feedback signal on a line 94, as modified by the bias provided by the source 96. The bias resulting from the source 96 will cause the pressure signal on a line 74 to bring the actuator 32 to a selected initial position, thereby compressing spring 18 as shown in FIG. 7 to an initial position which will produce the desired initial natural frequency in mass means 11 and 12 and therefore absorber 10. This actuator preloading is done so that actuator 32 can reciprocate either leftwardly or rightwardly and thereby vary the internal force being imposed upon mass means 11 and 12 in response to both rotor RPM increases and rotor RPM decreases. It will be realized that if actuator 32 were installed in its end travel position, it could respond to rotor RPM changes in one direction only.

The controller 44 is thus programmed to send a hydraulic pressure signal proportional to rotor RPM to absorber 10 and absorber 10 provides an actuator position feedback signal to the controller 44. It will be noted that this absorber is fixedly mounted from the fuselage.

Attention is now directed to FIG. 5 for a further explanation of this control system 47. The pressure signal from controller 44 goes to hydraulic valve 46, which receives aircraft supply pressure through line 48 and has hydraulic return line 50. Selectively pressurized hydraulic fluid passes through flexible pressure line 52 into common pressure line 54 from which it enters the two actuators 32a and 32b to selectively change the force being exerted by springs 18 on mass means 11 and 12 and hence the natural frequency thereof and of the vibration absorber 10. Similarly, position feedback signals from each actuator 32a and 32b are brought through position feedback line 56 to controller 44.

This control system 47 is an open loop position feedback system because it is preprogrammed, that is, it has been calibrated in the laboratory to return to a given position. It will be evident to those skilled in the art that this control system also has the capability of acting as a closed loop position feedback system.

Figure 11:
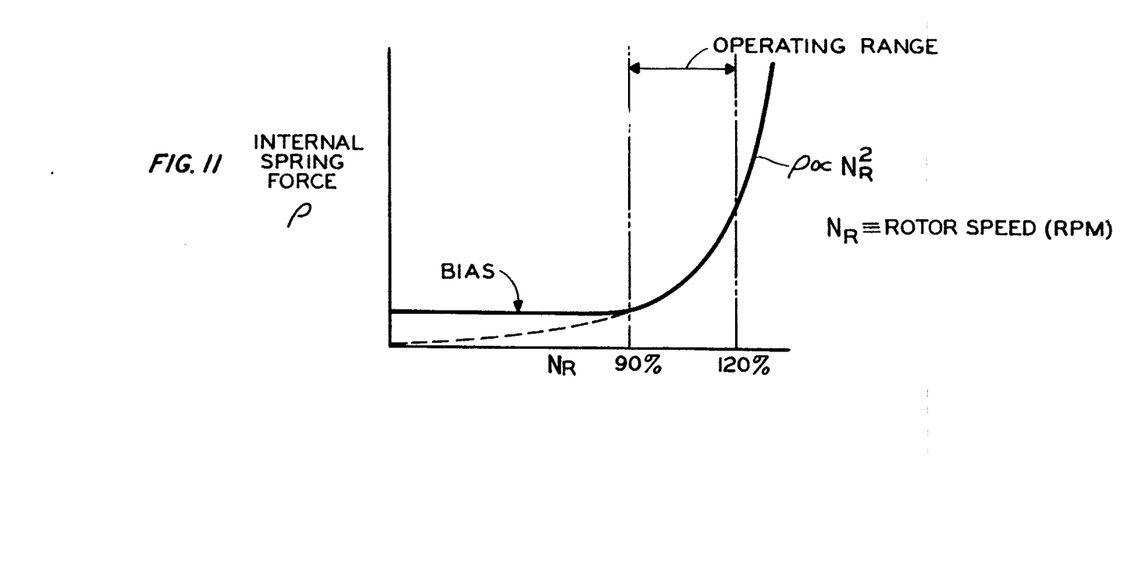
FIG. 11 is a graph of the fluid pressure acting on the spring member and hence the mass means, or the internal force so generated in the pendular mass means, plotted against rotor RPM.

The operation of our absorber is illustrated in the graph shown in FIG. 11 in which the pressure in the flexible pressure line 52 or the internal force imparted to the mass means 11 and 12 by spring 18 is plotted against rotor RPM ($N_R$). Biasing put into the system causes the pressure to be flat in the low RPM range, which is below the operating range, and then follows the curved graph portion representative of the formula $\rho^{\alpha} N_R^2$ where $\rho$ is the pressure and $N_R$ is the rotor speed (RPM). It will therefore be seen that over the region designated as "Operating Range" the force acting upon the vibration absorber 10 to vary its natural frequency varies as a function of rotor speed, in particular, rotor speed squared. This "Operating Range" is approximately 90 percent–120 percent.

Positive stop 99, which may be made of rubber, are attached to mass means 11 and 12 as best shown in FIG. 6 and serve to limit the useful motion of the mass members relative to the base member, to prevent metal-to-metal contact between the mass members and the associated vibration absorber parts.

It will therefore be seen that this variable frequency vibration absorber is an improved vibration absorber utilizing bifilar principles to take advantage of the lightweight, small dimensional envelope, the low inherent damping thereof, the high reliability thereof, the low friction generated thereby, and the minimum maintenance required therefore. This vibration absorber also utilizes a spring to compensate for the nonlinear pendulum effect of the pendular-type vibration absorber at high amplitudes, thereby making the absorber linear. It will further be realized that this vibration absorber changes its natural frequency as a function of rotor RPM so that the absorber will always be operating at its maximum level of effectiveness to reduce fuselage vibration due to rotor excitation. The absorber spring 18 is a selected spring rate which is controlled to initially preload the selected bifilar supported mass members to establish the initial natural frequency of the mass members and the absorber. The vibration absorber is thereafter controlled to vary the amount of loading by the spring on the absorber mass members as a function of rotor RPM to permit effective vibration absorption over a large span of rotor operating frequencies.

While this vibration absorber has been described in the helicopter environment to control the vibrations generated by the helicopter rotor and imparted thereby to the helicopter fuselage, it will be evident to those skilled in the art that it can be utilized in any fixed vibration prone system as a fixed vibration absorber operative to coact with the system principal vibration excitation source, as a function of the vibrations generated by the principal source, to reduce system vibration.

Further, while the preferred embodiment of the invention is directed to a fixed vibration absorber of the pendular-type with provisions for absorber natural frequency variation, it should be noted that the fixed bifilar vibration absorbers provides substantial advantages over prior art fixed vibration absorbers, even when used without the natural frequency variation capability, because the vibration absorber so used as a fixed natural frequency absorber will still have the inherent advantages of a bifilar-type system, namely its low inherent damping, lightweight, minimum space envelope, high reliability and minimum maintence.

Figure 12:
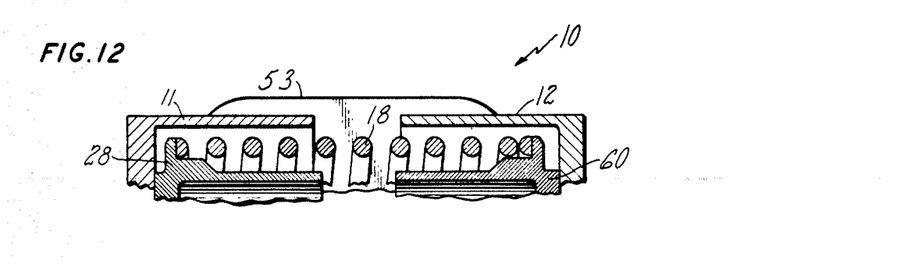
FIG. 12 is a partial showing of the vibration absorber used as a fixed frequency, fixed position absorber.

Viewing FIG. 12, we see vibration absorber 10 as a fixed frequency vibration absorber. When used as a fixed frequency vibration absorber as shown in FIG. 12, the absorber construction will be precisely as shown in FIGS. 5–8 in the preferred embodiment except that actuator 32 will be removed and preferably replaced by a spring retainer 60, which is preferably identical with retainer 28 but positioned at the opposite end of spring 18 therefrom and acting against mass member 12. With the removal of actuator 32, the actuator control mechanism 47 shown in FIGS. 5 and 10 is also eliminated. By viewing FIG. 12 it will be noted that the fixed frequency vibration absorber 10 includes mass members 11 and 12 supported by the same pendular-type connections shown in FIGS. 5–8 from base member 20 and with spring or springs 18 applying a force thereto tending to separate the mass means 10 and 12. The natural frequency of the FIG. 12 fixed frequency vibration absorber is determined by the mass of mass means 11 and 12 and the spring preload and spring rate of spring or springs 18. As in the FIGS. 5–8 variable frequency absorber, the FIG. 12 fixed frequency absorber is also linear in the same fashion.

Figure 13:
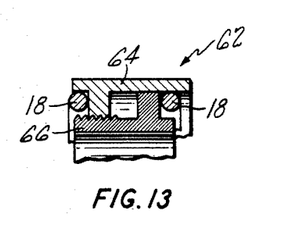
FIGS. 13 and 14 are cross-sectional illustrations of spacer means used in combination with the spring or springs in the FIG. 12 embodiment.
Figure 14:
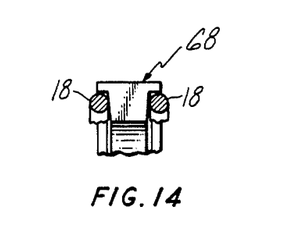
Figure 15:
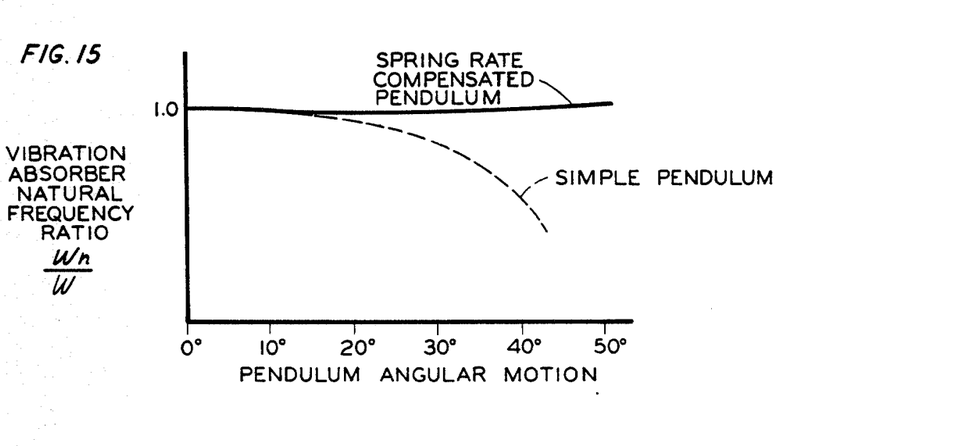
FIG. 15 is a graph of the vibration absorber natural frequency ratio plotted against pendular angular motion to illustrate the difference in operation between this linear vibration absorber and a conventional pendular vibration absorber.

It may be desired to modify the FIG. 12 fixed frequency modification as shown in FIGS. 13 or 14 to permit a degree of adjustment in establishing the preload force exerted by spring 18 and hence the natural frequency of absorber 10 prior to or after its installation either as a subassembly or after installation in the substructure requiring vibration suppression but not during operation. Viewing FIG. 13 we see a cross-sectional showing of spacer member 62 comprising inner and outer continuous and threaded ring members 64 and 66 in threaded engagement with one another so that the ring members 64 and 66 may be rotated manually relative to one another through the space shown in FIG. 12 between mass members 11 and 12 thereby varying the width or spacing dimension of variable spacer 62 to vary the force exerted by spring 18 on members 11 and 12. Spring 18 may be of one or two-piece construction. Viewing FIG. 14 we see spacer ring 68, shown in partial cross section, between one or two-piece spring 18 to serve as a spacer ring therebetween to vary the force exerted by the combination of spacer 68 and spring or springs 18 on masses 11 and 12. Spacer 68 is preferably of two or more piece, segmented construction so as to be manually positionable through the area shown in FIG. 12 between members 11 and 12 and joined by conventional connecting means to form a continuous spacer ring 68 as illustrated. Of course, for fixed frequency operation actuator 32 could be used but adjusted to a fixed position to preload springs 18 to establish a fixed natural frequency for absorber 10. To provide a better understanding of the operation of the vibration absorber, the design steps and considerations taken into account in optimizing the design will now be discussed. We first determined the useful motion which would be required and which is available in our pendular-type vibration absorber by estimating the impedance of the structure to be suppressed, such as helicopter fuselage, and considering both the location of the vibration absorber in the helicopter and the locations in the fuselage where vibrations are to be controlled, such as the cockpit or various cabin locations, one can determine the absorber dynamic mass required to reduce the fuselage to the desired vibration level. Knowing this and the frequency of operation of the vibration absorber dynamic masses, which, for example, happens to be four (4) times rotor RPM for a four bladed rotor, the required absorber dyanmic masses displacement operating travel, which is the absorber useful amplitude, can be established.

Having determined this useful motion or useful amplitude of our pendular-type vibration absorber, one can then determine the pendular length necessary to achieve maximum mass member desired angular displacement which we chose to be at ±45°. This was done by utilizing the equation:

$$\theta = \sin^{-1} \frac{X}{a}$$

Where:
$\theta$ = angular displacement of the mass member relative to the base member.
X = useful amplitude or motion, and
a = the pendular lengths and is equal to D−d, where D is the bushing diameter of the base member and mass members apertures, and d is the pin diameter.

Figure 16:
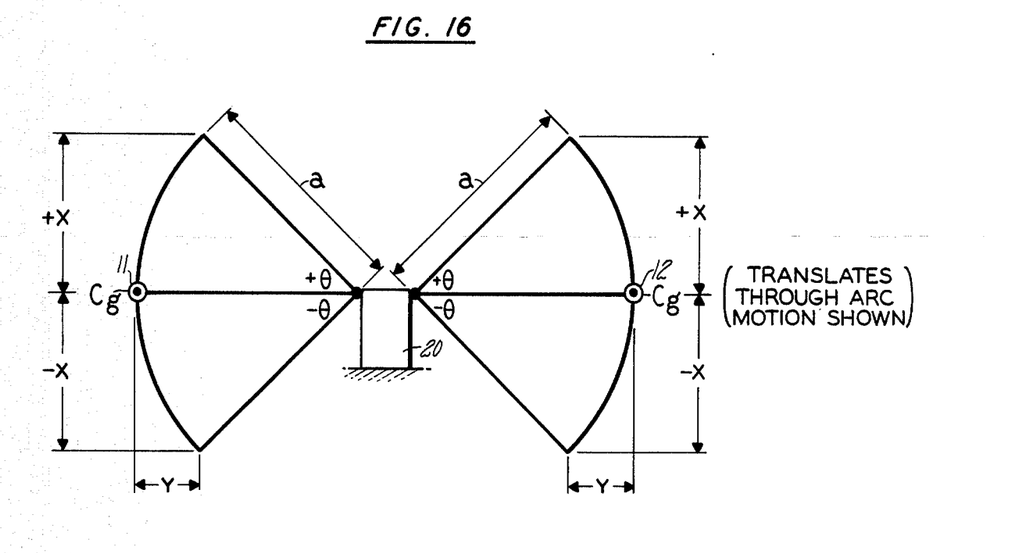
FIG. 16 is an illustration of the pendular motion of the oppositely mounted dynamic mass members of my vibration absorber to illustrate the amplitude of motion, angular motion amplitude, pendular arm length, and coil spring compression motion of the dynamic mass members. This figure further illustrates how the preloaded coil spring causes the oppositely mounted tuned mass members to move in coincident, allochiral pendular motion so that motion of the mass members produce additive forces in the direction of the vibrations of the principal vibration excitation source, and so that all other forces produced by such motion of the mass members mutually cancel.

The significance of what has been done to this point can best be realized by viewing FIG. 16 which show the pendular arc through which each part of each mass member moves relative to the base member. In FIG. 16, the c.g. of masses 11 and 12 are illustrated as having an angular displacement of +θ through −θ on opposite sides of their illustrated neutral positions, and with pendular length being "a", where a=D−d. This arcuate, translational pendular motion illustrated in FIG. 16 shows mass member amplitude, which is +X and −X, i.e. 2X total amplitude, and also shows mass member motion "Y", which determines the amount of compression of the spring members. It is important to note that the springs are defected or cycled twice for each full cycle of "X" motion of the mass members. In this connection, it will be noted that when the mass members start their downward motion from their +X position, which is also their full angular motion +θ position, the spring is maximally compressed the full distance 2Y and that the spring is also maximally compressed the full distance 2Y when the masses conclude their downward motion at position −X, which is also its full angular motion −θ position. This is the characteristic of the pendular type vibration absorber which produces the internal force being imposed by the spring members on the mass members as the mass moves through its arcuate motion, and hence the nonvariant natural frequency of the vibration absorber. While it is an inherent disadvantage in a pendular construction that it becomes more nonlinear as the angular displacement of the absorber mass members increase, this is overcome in this construction in that the spring is compressed its greatest at the points of maximum angular displacement to thereby maximize the internal force exerted by the springs on the mass members at that point, and thereby retain a first order linearity so that the natural frequency of the absorber is nonvariant with angular displacement. Maintaining linearity is important to maintaining high absorber amplification so that small dynamic masses can be operated at large useful amplitudes to obtain the necessary inertial reaction forces to suppress aircraft vibration.

A vibration system, such as this vibration absorber, can be described in terms of its effective mass and its effective spring rate ($K_x$). Since the effective mass has already been established, we determined the effective spring rate, or programmed rate in the case of a variable tuned absorber, necessary to achieve the desired absorber natural frequency or frequencies. This procedure is fully outlined in Den Hartog's work on "Mechanical Vibrations".

The internal steady load requirement for the absorber can be arrived at by the formula:

$$F_{nr} = (F_x)(a)$$

Where:
$F_{nr}$ = the internal steady load between the absorber masses for the various rotor speeds.
$K_x$ = the effective spring rate, and a is the length of the pendular arm, i.e., D−d.

Now this steady load, or loads, $F_{nr}$ is achieved by placing a spring between the mass member spring retainers having compressed the spring into position so that its internal loads will satisfy the requirement to establish the systems natural frequency (ies) in proper relation to the aircraft's impedance and excitation frequencies. This force $F_{nr}$ is comparable to the centrifugal force for an absorber installed in a rotating system.

The derived equations of motion will show that there is a preferred spring rate to maintain the absorber's linearity, and that this spring rate is dependent upon the internal load, $F_{nr}$, the pendular length, a, and the angular displacement $\theta$. The following equation expresses this relationship:

$$K_s = F_{nr}/a \left[ \frac{\left(1 - \frac{\sin \theta}{\theta}\right)\left(\frac{\theta}{2 \sin \theta}\right)}{(1 - \cos \theta)} \right]$$

Where: $K_s$ = the preferred spring rate of the physical spring. By considering normal operating conditions, typical values of $F_{nr}$ and $\theta$ can be chosen to select the desired spring rate $K_s$. This linearization is comparable to incorporating the cycloidal bushing taught in a U.S. patent application by John Madden filed on even date herewith and entitled "Constant Frequency Bifilar Vibration Absorber".

Using conventional methods, the steady and vibratory loads of the spring can be determined from previous data selected or established.

Then, using spring stress allowables, both steady and vibratory, the various spring designs available can be calculated using conventional approaches. Of the springs so selected, each must be checked with respect to static stability of the physical spring when placed between the spring retainers of the mass means under the load conditions imposed. Again, conventional approaches can be used to establish the permissible relationships for the compression coil spring which was chosen, for example, between the spring free length, compressed length, and mean diameter of the particular type of spring end constraints chosen. It is important to achieve the spring design with static stability without the need of guides, since such guides are likely to result in points of contact and introduce sliding friction which will increase the absorber's damping and reduce its performance. This basic spring technology is well known and fully explained in A. M. Wahl's book entitled "Mechanical Springs".

The transverse and axial installed spring natural frequencies for the springs under consideration must be checked out to determine that neither is close to the excitation frequencies of other absorber elements so as to avoid resonance therebetween, which could bring about metal-to-metal contact and cause fretting or introduce friction damping. The final relative motions determined for the selected spring then determines the clearances between vibration absorber components, for example, the radial clearance between the springs and the dynamic masses.

Since the connecting pins of the pendular-type connection will only contact the aperture bushings when the pins are subjected to compressive loading, it is necessary to determine all of their instantaneous applied loads from the spring and the inertia loads of all of the moving masses, and then it is necessary to place the pins and bushings in such locations that their reaction forces maintain compressive loads on the pins at all times. This occurs when the combined applied force of the spring and the mass members inertia loads have a resultant vector with a line of action which at all times extends between two sets of overlapping apertures and pins, to thereby assure both pitch and yaw stability, particularly pitch, see FIG. 8, of the mass members relative to the base member. It will further be seen that spreading the sets of pins/aperture bushings results in positive stability. Also, locating the dynamic mass c.g. close to the pins/aperture bushings results in positive stability by minimizing vertical pitch coupling.

Pin inertia must be kept sufficiently low so that the pins do not skid under rotational accelerated loading which is characteristic of vibratory motion. Positive reaction capability is determined by determining the pin instantaneous loading and is coefficient of friction with respect to the bushing. This absorber was determined to have no problems in this regard and therefore one-piece, solid pin members were used.

Knowing the maximum pin/aperture bushing applied loads, from above, the pin and bushing diameters, and using applicable stress allowables and modulus of selected materials, the widths of the pins and aperture bushings can be established by conventional means.

It will therefore be seen, as described and shown in greater particularity supra, that the fixed frequency vibration absorber taught herein is adapted to be fixedly attached to a vibration-prone system to cooperate with the principal vibration excitation source which primarily generates vibrations in a given direction, such as the vertical direction for a helicopter rotor, so as to control system vibrations. This fixed frequency vibration absorber comprises a base member having two mass members of selected equal mass supported from the base member in opposed positions preferably on opposite sides thereof, through pendular connecting means which support the mass means for allochiral pendular motion in the direction of the primary source vibrations. As used herein, allochiral means mirrorimage. Spring members extend between the mass means in preloaded condition to perform the dual function of exerting a fixed force on the mass means to thereby establish the fixed frequency thereof, and of the vibration absorber, and also to cause the mass means to move in coincident, allochiral pendular motion so that the motion of the mass members produces additive forces in the direction of the principal source vibrations to absorb or coact with the vibration force established by the principal source so that minimal vibration is imparted from the principal source to the area where the vibration absorber is mounted, such as a helicopter fuselage, and so that all other forces produced by the mass means pendular motion are mutually cancelled.

This will be best understood by viewing FIG. 16 which shows the centers of gravity of mass members 11 and 12 mounted on opposite sides of frame 20 through pendular, bifilar connections thereto, so that due to the force being exerted against masses 11 and 12 by preloaded spring 18 as shown supra, the mass members 11 and 12 are caused to move in allochiral, coincident pendular motion so that the mass members 11 and 12 coact to impart additive loads in the direction X and $-X$ to absorb or coact with the vibrations traveling in that direction from the principal excitation force, such as a helicopter rotor. It will also be noted that all other forces generated by the pendular motion of the opposed mass means 11 and 12 will be mutually cancelling in that the forces generated by each mass members in direction Y will be cancelled by an equal force in the opposite direction generated by the oppositely mounted mass means. In addition, the spring rate of the spring members are selected, so that, as best described in connection with the earlier description of FIG. 16, the force imparted by the spring members to the mass members increases with mass members angular motion amplitude, thereby causing the fixed frequency of the vibration absorber to remain substantially constant to thereby produce a substantially linear vibration absorber.

I wish it to be understood that I do not desire to be limited to the exact details of construction shown and described, for obvious modifications will occur to a person skilled in the art.

I claim:

1. A fixed frequency vibration absorber adapted to be fixedly attached to a vibration prone system to cooperate with the principal vibration excitation source which primarily generates vibrations in a given direction so as to control system vibrations and comprising:
   base means,
   two mass means of selected equal mass,
   pendular connecting means, having a pendular arm of length "a", connecting said mass means in opposed positions to said base means for support from and allochiral pendular motion in said given direction.
   spring means operatively connected between said mass means in selectively preloaded condition to exert a force "Fnr" on said mass means to establish the desired natural frequency thereof, and to also cause said mass means to move in coincident, allochiral pendular motion so that motion of said mass means produces additive forces in said given direction to absorb the vibration force established by said principal source, and so that all other forces so produced mutually cancel, said spring means also being of selected spring rate "Ks" to compensate for the spring rate reduction caused by pendular motion of the pendular connecting means and thereby provide an essentially linear spring rate acting on said mass means for angles of pendular motion "θ" of at least ±45°, so that the natural frequency of the vibration absorber is substantially constant throughout this range of operation, and wherein "Ks" is selected according to the equation:

$$K_s = F_{nr}/a \left[ \frac{\left(1 - \frac{\sin\theta}{\theta}\right)\left(\frac{\theta}{2\sin\theta}\right)}{(1 - \cos\theta)} \right]$$

2. A vibration absorber according to claim 1 wherein said spring means exerts a force to separate said mass means or to move said mass means closer together.

3. A vibration absorber according to claim 2 wherein said connecting means comprises three pendular connections between said base means and each of said mass members, which connections are spaced in two substantially perpendicular directions to provide stability in the support of the mass means from the base means.

4. A vibration absorber according to claim 3 and wherein said three pendular connections are located at the apex of a triangle to provide two directional geometric stability to each of the mass means from the base means.

5. A vibration absorber according to claim 4 wherein each of said pendular connections comprises overlapping apertures of selected diameters and having parallel axes perpendicular to said given direction in said base means and said mass means, and a pin member of selected diameter and having an axis parallel to the aperture axes and extending through the overlapping apertures thereby joining the mass means to the base means for pendular motion with respect thereto.

6. A vibration absorber according to claim 5 wherein said diameters of said overlapping apertures are equal.

7. A vibration absorber according to claim 1 and including:
means to adjust the fixed preload of said spring member to adjust the fixed natural frequency of the vibration absorber.

8. A vibration absorber according to claim 6 wherein said spring means is at least one spring of selected spring rate and at least one spacer member positioned in series with said spring between said mass means cooperating with said spring to exert a combined force on said mass means.

* * * * *

UNITED STATES PATENT AND TRADEMARK OFFICE
CERTIFICATE OF CORRECTION

PATENT NO. : 4,550,812

DATED : November 5, 1985

INVENTOR(S) : Kenneth C. Mard

It is certified that error appears in the above-identified patent and that said Letters Patent is hereby corrected as shown below:

IN THE SPECIFICATION:

Col. 11, Line 21      "a" should read -- $\alpha$ --

Col. 14, Line 17      "$(F_x)$" should read --$(K_x)$--

Signed and Sealed this
Fourteenth Day of October, 1986

[SEAL]

*Attest:*

DONALD J. QUIGG

*Attesting Officer*    *Commissioner of Patents and Trademarks*